US012771281B2

(12) United States Patent
Weller et al.

(10) Patent No.: US 12,771,281 B2
(45) Date of Patent: Oct. 20, 2026

(54) AERODYNAMIC REAR WIND DEFLECTOR FOR SOLAR MODULE FIELDS

(71) Applicant: Enstall Europe B.V., Deventer (NL)

(72) Inventors: Jeroen Weller, Apeldoorn (NL); Alan Voogd, Haaksbergen (NL); Maarten Alexander Smit, Nijverdal (NL)

(73) Assignee: Enstall Europe B.V., Deventer (NL)

( * ) Notice: Subject to any disclaimer, the term of this patent is extended or adjusted under 35 U.S.C. 154(b) by 0 days.

(21) Appl. No.: 19/151,102

(22) PCT Filed: Jan. 24, 2024

(86) PCT No.: PCT/IB2024/050679

§ 371 (c)(1),
(2) Date: Jul. 25, 2025

(87) PCT Pub. No.: WO2024/157193

PCT Pub. Date: Aug. 2, 2024

(65) Prior Publication Data

US 2026/0121575 A1 Apr. 30, 2026

Related U.S. Application Data

(60) Provisional application No. 63/441,145, filed on Jan. 25, 2023.

(51) Int. Cl.
*H02S 20/23* (2014.01)

(52) U.S. Cl.
CPC .................................... *H02S 20/23* (2014.12)

(58) Field of Classification Search
CPC ....................................................... H02S 20/23
See application file for complete search history.

(56) References Cited

U.S. PATENT DOCUMENTS 9,312,414 B2 * 4/2016 Ilzhoefer ................. F24S 25/13
2004/0250491 A1 * 12/2004 Diaz ....................... F24S 25/16
52/518

(Continued)

FOREIGN PATENT DOCUMENTS

CN 1592973 A 3/2005
EP 2362161 A1 8/2011

(Continued)

OTHER PUBLICATIONS

Solar Construct—https://youtu.be/HVVg8hRZNLg?t=116 posted Nov. 11, 2020.

(Continued)

*Primary Examiner* — Terrell L Mckinnon
*Assistant Examiner* — Ding Y Tan
(74) *Attorney, Agent, or Firm* — The Webb Law Firm

(57) ABSTRACT

A wind deflector for a solar panel module and mounting system may include a body having a rounded portion and a flat portion extending from the rounded portion; a leg extending from the rounded portion; a first lip extending from the leg; and a second lip extending from the flat portion. The first and second lips may be configured to engage with corresponding mounting components of a mounting system for a solar panel module, so that the wind deflector is aligned along a length of the solar panel module, and the length of the wind deflector may be less than the length of the solar panel.

11 Claims, 11 Drawing Sheets

(56) References Cited

U.S. PATENT DOCUMENTS

| | | | | |
|---|---|---|---|---|
| 2009/0242014 | A1* | 10/2009 | Leary | F24S 25/16 52/173.3 |
| 2009/0320906 | A1* | 12/2009 | Botkin | H02S 30/10 136/251 |
| 2012/0031472 | A1* | 2/2012 | Chan | H02S 20/24 136/251 |
| 2012/0186632 | A1* | 7/2012 | Reinhold | H02S 30/20 136/251 |
| 2012/0273029 | A1* | 11/2012 | Bragagna | F24S 25/13 126/621 |
| 2013/0000219 | A1* | 1/2013 | Kudav | F24S 25/16 52/84 |
| 2013/0015303 | A1* | 1/2013 | Gies | F24S 25/617 248/176.1 |
| 2013/0255167 | A1* | 10/2013 | Concho | F24S 40/85 52/173.3 |
| 2013/0276867 | A1* | 10/2013 | Wildes | H02S 20/23 136/246 |
| 2013/0298968 | A1* | 11/2013 | Laitila | H02S 20/24 136/251 |
| 2014/0014158 | A1* | 1/2014 | Wildes | F24S 25/11 136/246 |
| 2014/0069485 | A1* | 3/2014 | Rawlings | F24S 25/00 136/251 |
| 2014/0130849 | A1* | 5/2014 | Silberschatz | F24S 40/85 136/251 |
| 2014/0299179 | A1* | 10/2014 | West | H02S 20/24 136/251 |
| 2015/0101996 | A1* | 4/2015 | Nayar | F24S 25/65 211/41.1 |
| 2015/0256120 | A1* | 9/2015 | Anderson | F16M 11/06 136/251 |
| 2015/0295533 | A1* | 10/2015 | Needham | F24S 25/13 136/251 |
| 2017/0133977 | A1* | 5/2017 | Tripp | H02S 20/23 |
| 2018/0294764 | A1 | 10/2018 | Stearns et al. | |
| 2019/0013772 | A1* | 1/2019 | Bamat | F24S 25/636 |
| 2021/0257960 | A1 | 8/2021 | Goorman et al. | |

FOREIGN PATENT DOCUMENTS

| | | |
|---|---|---|
| WO | 2013009894 A1 | 1/2013 |
| WO | 2014022921 A1 | 2/2014 |

OTHER PUBLICATIONS

ARaymond Energies, "PowAR Cinch Fastening Clip for Framed Modules", Product Brochure, Nov. 4, 2023.

Panelclaw, "ClawFR 10 Dual Tilt", Product Brochure, 2019.

* cited by examiner

AERODYNAMIC REAR WIND DEFLECTOR FOR SOLAR MODULE FIELDS

CROSS-REFERENCE TO RELATED APPLICATIONS

This application is the United States national phase of International Patent Application No. PCT/IB2024/050679, filed Jan. 24, 2024, and claims priority to U.S. Provisional Patent Application Ser. No. 63/441,145, filed on Jan. 25, 2023, the disclosures of which are hereby incorporated by reference in their entireties.

BACKGROUND OF THE INVENTION

Field of the Invention

This disclosure relates generally to solar panel systems and, more particularly, to a wind deflector used in connection with a solar panel or solar panel array.

Description of Related Art

Solar panels must handle a variety of environmental conditions. Winds are one of those factors and solar panel arrays, especially south-facing solar panel arrays must account for lift forces caused by the wind. These lift forces act against the underside of a solar panel module and can be greater than the lift forces created by wind speed alone because the air flowing over the top of the solar panel modules creates a low pressure zone and causes air to be drawn upward. When a solar panel module is mounted on a roof, these forces can combine with the lift forces that are also created by pitched surfaces. This can interfere with the operation of the solar panels, including lifting the solar panels and/or the solar panel modules from their mounting structures. Thus, there is a need to deflect wind to prevent it from acting under the solar panels, and there is a need to optimize the deflection of wind in order to prevent the wind from acting under multiple solar panels arranged in an array.

Wind deflectors that are known in the art also require tools in order to install the deflectors relative to a solar panel. Using tools on roof installations can be cumbersome. Thus, there also exists a need for a wind deflector that can be installed without tools.

SUMMARY OF THE INVENTION

According to one embodiment or aspect of the present disclosure, a wind deflector for a solar panel module and mounting system may include a body having a rounded portion and a flat portion extending from the rounded portion; a leg extending from the rounded portion; a first lip extending from the leg; and a second lip extending from the flat portion. The first lip and the second lip may be configured to engage with corresponding mounting components of a mounting system for a solar panel module, so that the wind deflector is aligned along a length of the solar panel module, and the length of the wind deflector may be less than the length of the solar panel. The alignment of the wind deflector with the solar panel module may be such that portions of the wind deflector extend beyond the solar panel module by at least 3.5 inches. The first lip may engage with a first corresponding mounting component a distance away from a solar panel within the solar panel module. The first lip may engage with a first corresponding mounting component a distance away from a solar panel within the solar panel module. The first corresponding mounting component may include a base clamp, and the base clamp may include a body; and at least one flange configured to engage the first lip.

In another embodiment or aspect, the at least one flange may include a plurality of flanges defining a gap therebetween, the gap being configured to receive the first lip therein. The second lip may engage with a second corresponding mounting component, and the second corresponding mounting component may include a clip configured to connect to a rail of the solar panel module. The second lip and the flat portion may define a channel therebewteen, and the clip may include a bar configured to fit within the channel and two opposing legs configured to fit about the rail. The two opposing legs may be configured to engage opposing sides of the rail. The two opposing legs may each include a hook further configured to engage the opposing corners of the rail.

According to another embodiment or aspect of the present disclosure, a solar panel system may include a solar panel module having a frame and photovoltaic panel mounted thereto, the solar panel module having a first length; a mounting arrangement having a post and a rail, the post being configured to support the solar panel module thereon; and a wind deflector comprises a first end, a second end, a body extending therebetween, and a second length extending parallel to the first and second ends. The first end may be configured to be mounted to the post, and the second end is configured to be mounted to the rail, and the second length may be shorter than the first length. The wind deflector may further have a first edge and a second edge, the second length extending between the first edge and the second edge, and the first end may be mounted to the post and the second end may be mounted to the rail. At least a portion of the solar panel module may extend beyond both of the first edge and the second edge.

According to another embodiment or aspect, the portions of the solar panel module may extend beyond the first and second edges by at least 3.5 inches. The body of the wind deflector may further include a first lip at the at the first end; a rounded portion extending from the leg; a flat portion extending from the rounded portion; and a second lip extending from the flat portion. The first lip may be configured to be mounted to the post and the second lip is configured to be mounted to the rail. The post may include a base clamp having a first end and a second end. The base clamp may include a groove proximate the first end configured to receive the frame therein, and at least one flange configured to engage the first lip. The at least one flange may include a plurality of flanges defining a space therebetween, and the space may be configured to receive the first lip therein.

According to yet another embodiment or aspect, the solar panel system may further include a clip configured to fit about the rail, the clip being further configured to engage with the second lip. The second lip and the flat portion may define a channel, and the clip may include a bar configured to fit at least partially within the channel in order to mount the second lip to the rail. The clip may further include two arms extending from opposing ends of the bar, the two arms configured to engage opposing sides of the rail. The clip may further include two hooks, each extending from one of the two arms, and the two hooks may be configured to engage with a side of the rail opposite the side against which the wind deflector is mounted.

The invention according to the present disclosure can be characterized by one or more clauses shown below.

Clause 1. A wind deflector for a solar panel module and mounting system, the wind deflector comprising: a body comprising a rounded portion and a flat portion extending from the rounded portion; a leg extending from the rounded portion; a first lip extending from the leg; and a second lip extending from the flat portion, wherein the first lip and the second lip are configured to engage with corresponding mounting components of a mounting system for a solar panel module, so that the wind deflector is aligned along a length of the solar panel module, and wherein the length of the wind deflector is less than the length of the solar panel.

Clause 2. The wind deflector of clause 1, wherein the alignment of the wind deflector with the solar panel module is such that portions of the solar panel module extend beyond opposing edges of the wind deflector.

Clause 3. The wind deflector of either of clause 1 or 2, wherein the portions of the solar panel module extend beyond the opposing edges of the wind deflector by at least 3.5 inches.

Clause 4. The wind deflector of any of clauses 1-3, wherein the first lip engages with a first corresponding mounting component a distance away from a solar panel within the solar panel module.

Clause 5. The wind deflector of any of clauses 1-4, wherein the first corresponding mounting component comprises a base clamp, the base clamp comprising: a body; and at least one flange configured to engage the first lip.

Clause 6. The wind deflector of any of clauses 1-5, wherein the at least one flange comprises a plurality of flanges defining a gap therebetween, the gap being configured to receive the first lip therein.

Clause 7. The wind deflector of any of clauses 1-6, wherein the second lip engages with a second corresponding mounting component, the second corresponding mounting component comprising a clip configured to connect to a rail of the solar panel module.

Clause 8. The wind deflector of any of clauses 1-7, wherein the second lip and the flat portion define a channel therebetween, and the clip comprises a bar configured to fit within the channel and two opposing legs configured to fit about the rail of the solar panel module.

Clause 9. The wind deflector of any of clauses 1-8, wherein the two opposing legs are configured to engage opposing sides of the rail.

Clause 10. The wind deflector of any of clauses 1-9, wherein the two opposing legs each comprise a hook further configured to engage opposing corners of the rail.

Clause 11. A solar panel system comprising: a solar panel module comprising a frame and photovoltaic panel mounted thereto, the solar panel module having a first length; a mounting arrangement comprising a post and a rail, the post being configured to support the solar panel module thereon; and a wind deflector comprises a first end, a second end, a body extending therebetween, and a second length extending parallel to the first and second ends, wherein the first end is configured to be mounted to the post, and the second end is configured to be mounted to the rail, and wherein the second length is shorter than the first length.

Clause 12. The solar panel system of clause 11, wherein the wind deflector further comprises a first edge and a second edge, the second length extending between the first edge and the second edge, and wherein, when the first end is mounted to the post and the second end is mounted to the rail, at least a portion of the solar panel module extends beyond both of the first edge and the second edge.

Clause 13. The solar panel system of either clause 11 or 12, wherein the portions of the solar panel module extending beyond the first and second edges extend beyond the first and second edges by at least 3.5 inches.

Clause 14. The solar panel system of any of clauses 11-13, wherein the body of the wind deflector further comprises: a first lip at the at the first end; a leg extending from the lip; a rounded portion extending from the leg; a flat portion extending from the rounded portion; and a second lip extending from the flat portion, wherein the first lip is configured to be mounted to the post and the second lip is configured to be mounted to the rail.

Clause 15. The solar panel system of any of clauses 11-14, wherein the post comprises a base clamp having a first end and a second end, the base clamp comprising: a groove proximate the first end configured to receive the frame therein; and at least one flange configured to engage the first lip.

Clause 16. The solar panel system of any of clauses 11-15, wherein the at least one flange comprises a plurality of flanges defining a space therebetween, the space configured to receive the first lip therein.

Clause 17. The solar panel system of any of clauses 11-16, further comprising a clip configured to fit about the rail, the clip being further configured to engage with the second lip.

Clause 18. The solar panel system of any of clauses 11-17, wherein the second lip and the flat portion define a channel, and the clip comprises a bar configured to fit at least partially with the channel in order to mount the second lip to the rail.

Clause 19. The solar panel system of any of clauses 11-18, wherein the clip further comprises two arms extending from opposing ends of the bar, the two arms configured to engage opposing sides of the rail.

Clause 20. The solar panel system of any of clauses 11-19, wherein the clip further comprises two hooks, each extending from one of the two arms, the two hooks configured to engage with a side of the rail opposite the side against which the wind deflector is mounted.

BRIEF DESCRIPTION OF THE DRAWING(S)

DESCRIPTION OF THE INVENTION

Figure 1:
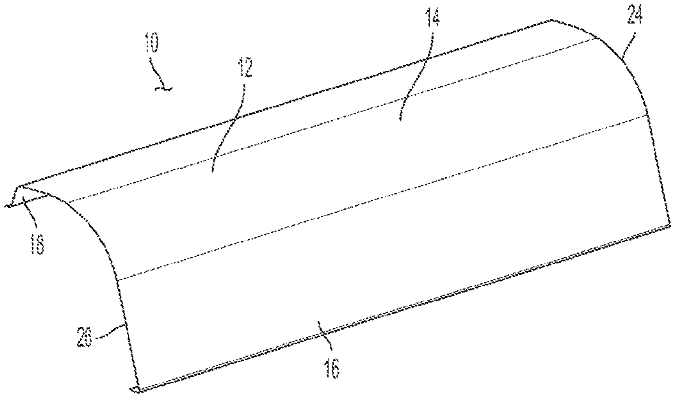
FIG. 1 is a perspective view of a wind deflector according to one embodiment or aspect of the present disclosure.
Figure 2:
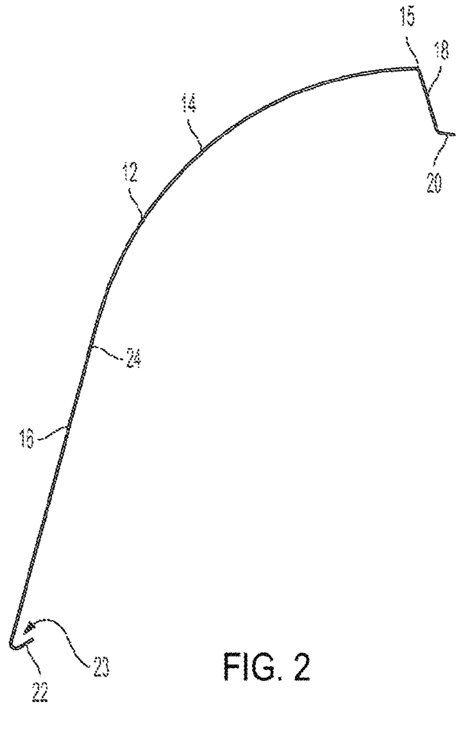
FIG. 2 is a side view of the wind deflector shown in FIG. 1.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

Figure 3:
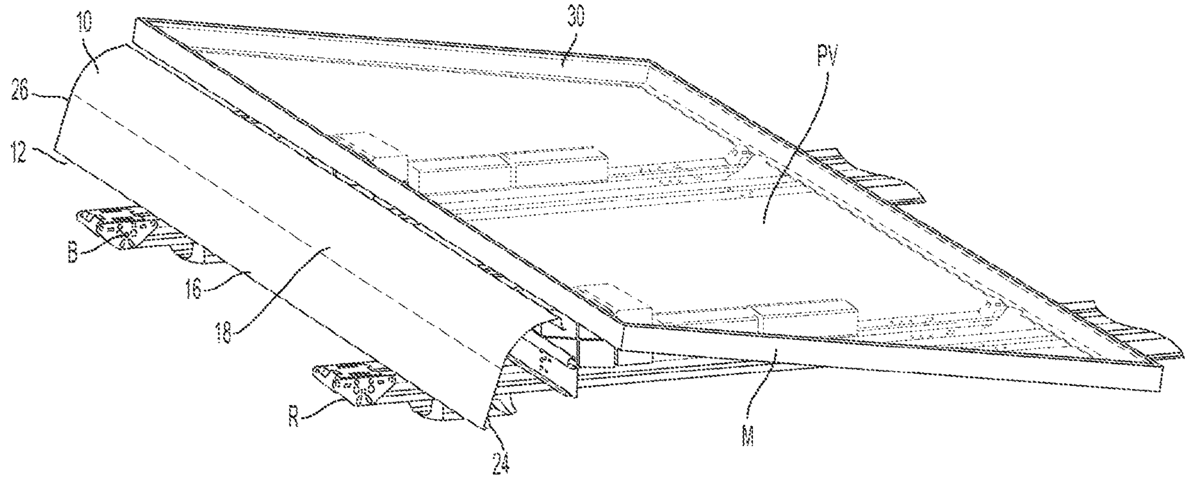
FIG. 3 is a perspective view of a solar panel system with the wind deflector shown in FIG. 1 mounted thereto.
Figure 18:
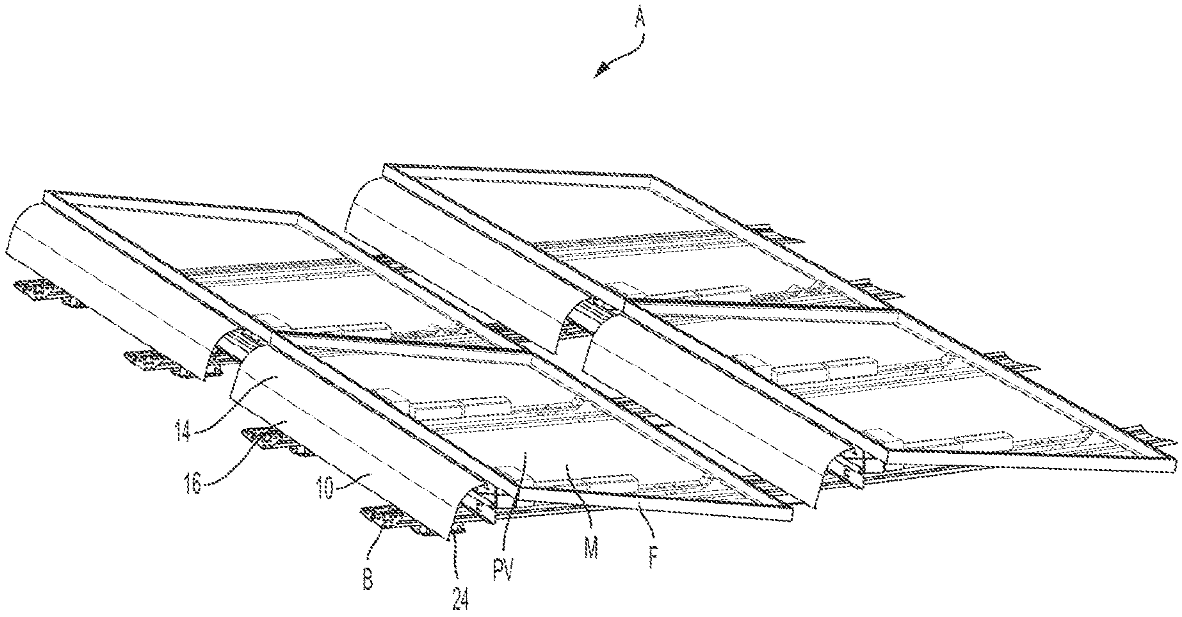
FIG. 18 is a perspective view of a solar panel array having a plurality of solar panel systems shown in FIG. 3

The present disclosure is directed to a wind deflector and, in particular, a wind deflector 10 for use with solar panels and solar panel systems. An example of a solar panel system, as shown in FIGS. 3 and 18, includes a solar panel module M, supported by rails R and posts P. The solar panel modules M include a frame F that holds a photovoltaic panel PV therein. These can be arranged in arrays A. As discussed herein, the wind deflector 10 is used with a south-facing solar panel or solar panel system, but uses in other systems are contemplated.

With reference to FIGS. 1-4, an embodiment of a wind deflector 10 according to one aspect of the present disclosure is shown. The wind deflector 10 includes a body 12, which has a curved portion 14 and a flat portion 16. The curved portion 14 is located at and near the top of the body 12, and the flat portion 16 extends below the curved portion 14 to the bottom of the body 12. Together, the curved portion 14 and the flat portion 16 define a semi-elliptical shape, with the top part of the curved portion 14 defining a peak 15. The curved nature of the semi-elliptical shape of the wind deflector 10 helps to reduce its drag value when it is used with a solar panel as will be discussed in greater detail below.

From the peak 15, a leg 18 extends from the curved portion 14 in the downward direction similar to the flat portion 16. A first lip 20 extends from the leg 18 and is angled relative thereto, while also extending at least partially in the downward direction. The first lip 20 may form a first end of the wind deflector 10. As shown, the leg 18 forms an obtuse angle with the curved portion 14, and the first lip 20 also forms an obtuse angle with the leg. However, these angles may be modified depending on how the wind deflector 10 is to be applied to a solar panel system 30, examples of which are shown in FIGS. 3, 4, 10, 11, and 18.

Extending from the end of the flat portion 16 is a second lip 22. The second lip 22 extends in the upward direction at approximately a 45 degree angle relative to the flat portion 16. This angle may also be modified depending on how the wind deflector 10 may be applied to a solar panel system. The second lip 22 and the flat portion 16 define a channel 23 that will be used to mount the wind deflector 10, the process of which will be discussed in greater detail below. The second lip 22 may form a second end of the wind deflector 10.

The wind deflector 10 also includes side edges 24, 26. The body 12, including both the curved portion 14 and the flat portion 16, extends between the side edges 24, 26. As can be seen in FIG. 3, the side edges 24, 26 do not extend beyond the solar panel module M when the wind deflector 10 is mounted to the system. This arrangement optimizes the wind flow properties around the solar panel module M. This optimization ensures that the lift force created by air flowing under the module M is not strong enough to interfere with the operation of the module M, including lifting the module M up from the roof or surface it is mounted on. In some instances, lift forces created by wind can be strong enough to lift a ballasted system up from the roof, so the wind deflector 10 can help mitigate this problem. In some instances a wind deflector 10 may reduce or eliminate the need for a ballasted system or the amount of ballast required to secure a ballasted system. The solar panel module M may extend beyond each edge 24, 26 of the wind deflector 10 by approximately 1-5 inches (2.54-12.70 cm). The reduction of lift forces may be further reduced when the solar panel module M extends beyond each edge 24, 26 by approximately 3.5-4 inches (8.89-10.16 cm). This arrangement creates a gap of approximately 7-8 inches (17.78-20.32 cm) between adjacent wind deflectors 10 when arranged in a solar panel array A, as shown in FIG. 18. In particular, the lift forces may be best reduced when the solar panel module M extends 3.94 inches (10.00 cm) beyond the wind deflector 10. This arrangement creates a gap of approximately 7.88 inches (20.00 cm) between adjacent wind deflectors 10 when arranged in a solar panel array A. At least 3.94 additional inches (10.00 cm) may be added to either side of the 7.88 inches (20.00 cm) that make up the gap and the wind deflector 10 will still adequately shield the solar panel module M from drag forces of the wind. While the body 12 is shown as being solid, it is understood that perforations may be added to manipulate wind flow through the deflector 10 or to assist in aligning the wind deflector 10 relative to the solar panel module M.

Figure 4:
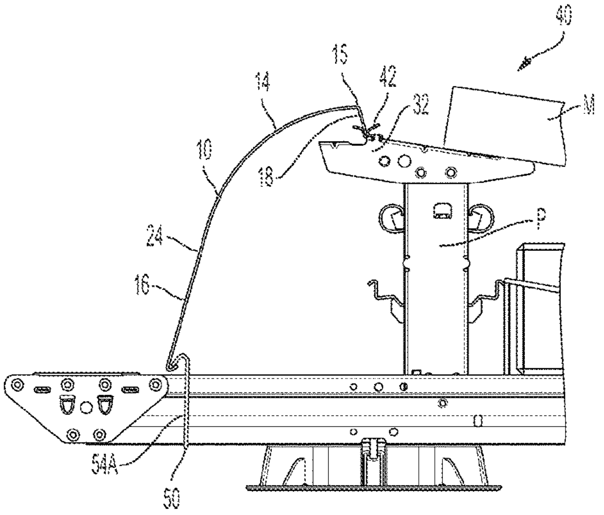
FIG. 4 is a side view of the solar panel system shown in FIG. 3.
Figure 5:
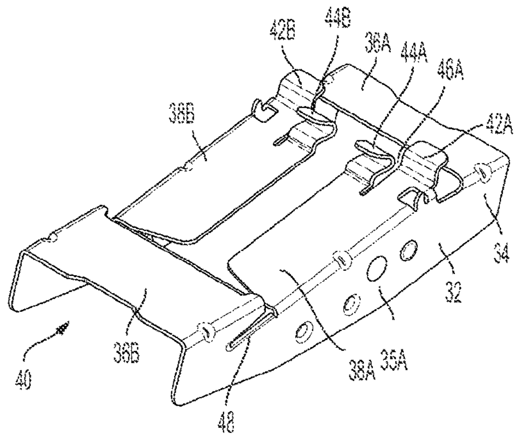
FIG. 5 is a perspective view of a base clamp according to one embodiment or aspect of the present disclosure.
Figure 6:
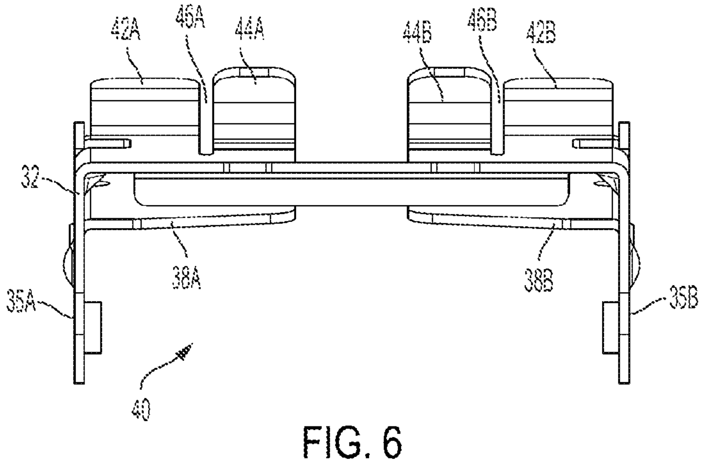
FIG. 6 is a front view of the base clamp shown in FIG. 5.

FIGS. 4-17 show different elements that serve to mount the wind deflector 10 to the solar panel system 30. Each of these elements are designed so that the wind deflector 10 can be installed without tools. With reference to FIGS. 4-10, a base clamp 32 is shown. In FIG. 4, the base clamp 32 is attached to a post P in a solar panel system. The base clamp 32 includes a hollow body 34 that receives the post P therein. The body 34 also includes two sidewalls 35A, 35B, two surfaces 36A, 36B extending across and connecting the two sidewalls 35A, 35B, and two panels 38A, 38B extending from a respective sidewall 35A, 35B into the center of the base clamp 32. Together, each of these elements defines the hollow 40 within the body 34. The post P is received within the hollow 40 and can be secured therein using methods known to those having skill in the art. The panels 38A, 38B can bend or rotate about the sidewalls 35A, 35B to fit the base clamp 32 onto the post P at different heights.

Figure 7:
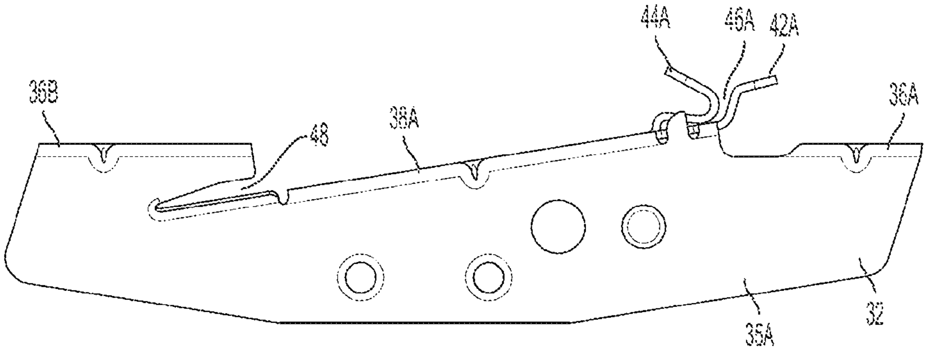
FIG. 7 is a side view of the base clamp shown in FIG. 5.
Figure 8:
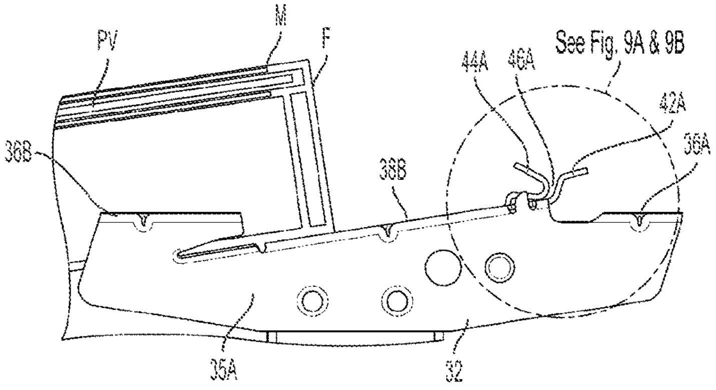
FIG. 8 is a side view of the base clamp shown in FIG. 5 with a solar panel module mounted thereon.

Both of the panels 38A, 38B include an outer flange 42A, 42B and an inner flange 44A, 44B. The flanges 42A, 44A on the first panel 38A define a space 46A, and the flanges 42B, 44B on the second panel 38B define a space 46B. Both spaces 46A, 46B extend at least partially into the panels 38A, 38B and are designed to receive the first lip 20 and at least part of the leg 18 of the wind deflector 10. As shown in FIGS. 5 and 7-9B, each flange 42A, 42B, 44A, 44B has a generally curved shape. The outer flanges 42A, 42B extend from their respective panel 38A, 38B, taking an S-shape when viewing the sidewall 35A, as in FIG. 8. The inner flanges 44A, 44B take a reverse C-shape when viewed from sidewall 35A. With these shapes, the top portions of the outer flanges 42A, 42B extend in a direction generally opposite that of the top portions of the inner flanges 44A, 44B, as seen in FIG. 7. The top portions of the inner flanges 44A, 44B and outer flanges 42A, 42B also define an obtuse The base clamp 32 also includes a receiving space 48 located at least partially below surface 36B. The receiving space 48 can be generally V-shaped and is designed to receive a bottom flange of a frame F of a solar panel module M therein. The receiving space 48 aligns the solar panel module M opposite that of the wind deflector 10 as discussed below and shown in FIGS. 4 and 10. Examples of the receiving space 48 are further described in U.S. patent application Ser. No. 16/793,352, the disclosure of which is hereby incorporated by reference in its entirety.

Figure 9A:
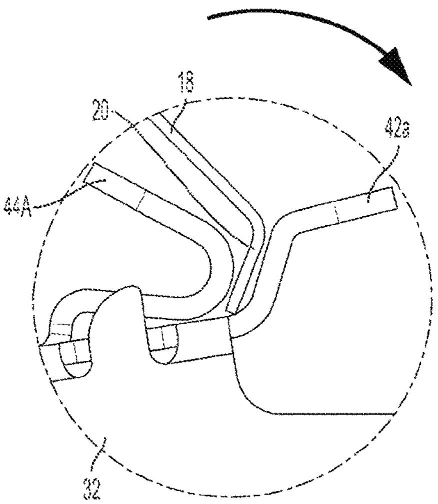
FIG. 9A is a side view of the highlighted area shown FIG. 8, showing the insertion of a wind deflector into the base clamp.
Figure 9B:
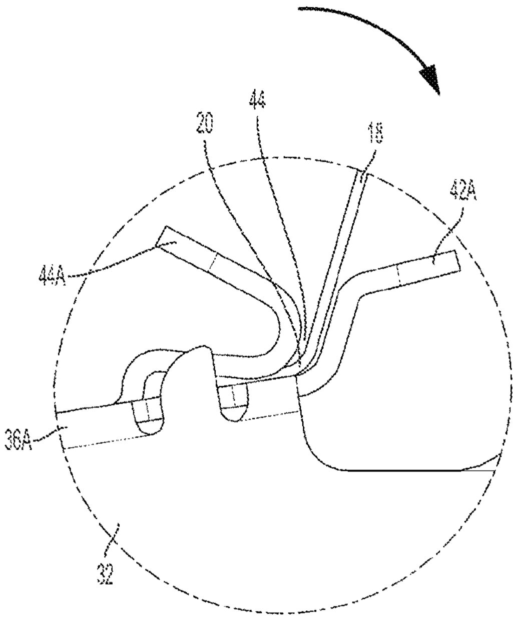
FIG. 9B is a side view of the highlighted area shown in FIG. 8, showing the insertion of a wind deflector into the base clamp.
Figure 10:
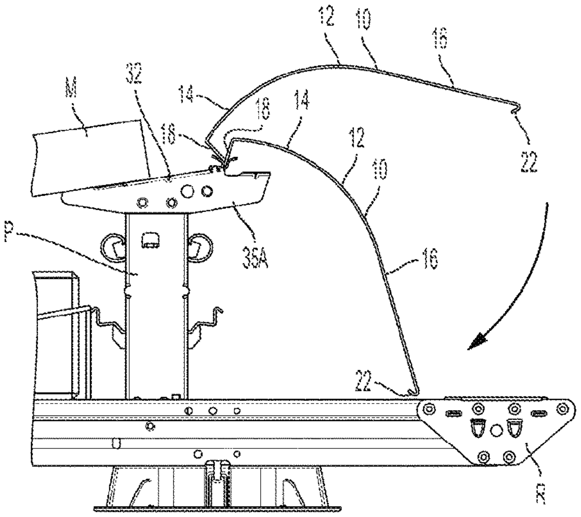
FIG. 10 is a side view of the solar panel system shown in FIG. 3, showing the mounting of the wind deflector to the system.
Figure 11:
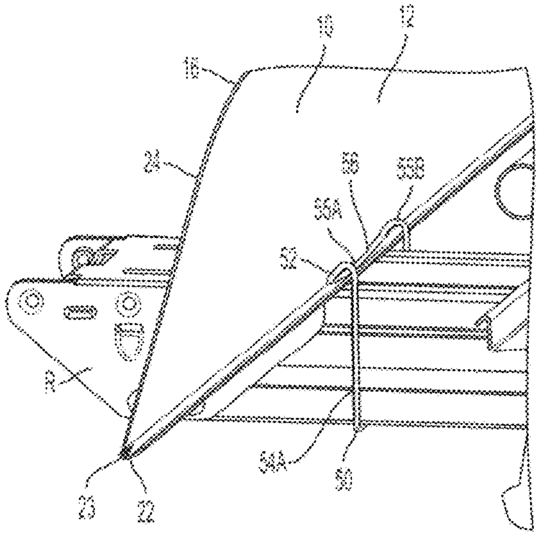
FIG. 11 is a perspective view of the bottom of the solar panel system shown in FIG. 3, showing the wind deflector mounted to a rail.
Figure 12:
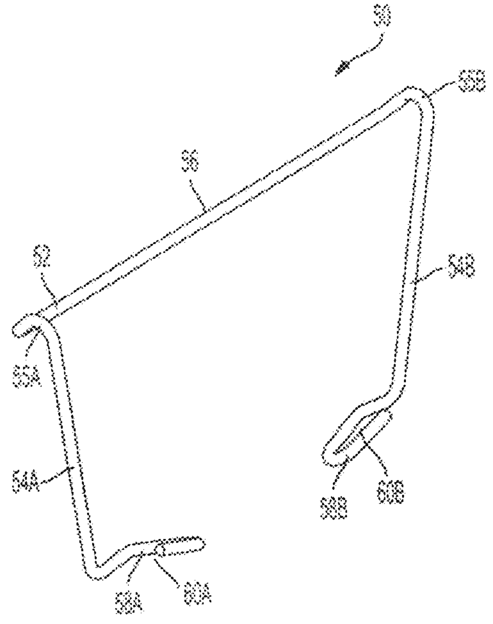
FIG. 12 is a perspective view of a clip according to one aspect or embodiment of the present disclosure.
Figure 15:
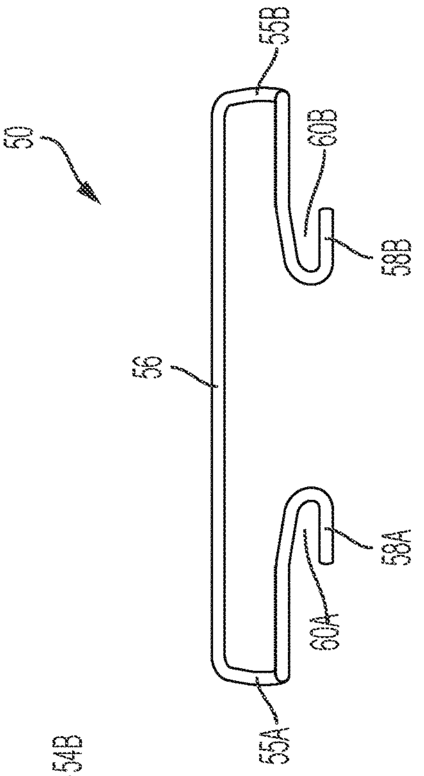
FIG. 15 is a bottom view of the clip shown in FIG. 12.
Figure 14:
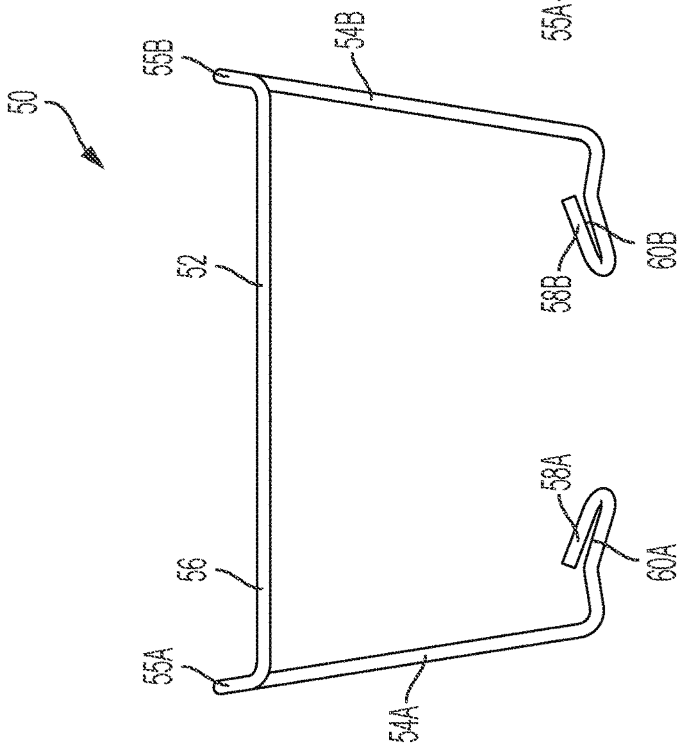
FIG. 14 is a front view of the clip shown in FIG. 12.

As shown in FIGS. 9A and 9B, to mount the wind deflector 10 to the base clamp 32, the first lip 20 is inserted into the spaces 46A, 46B. Although, only one space 46A is shown in FIGS. 9A and 9B, the same action occurs at the other space 46B. The angle between the first lip 20 and the leg 18 allows an installer to tilt and rotate the wind deflector 10 in the direction of the arrow shown in FIG. 9A. This action rotates the first lip 20 and leg 18 about the inner flange 44A as the first lip 20 and leg 18 slide within the space 46A. After the turning action is performed, the first lip 20 is held under a curved portion of the inner flange 44A. The curved portion of the inner flange 44A applies a holding force against the first lip 20 and leg 18 and within the outer flange 42A. This holding force keeps the first lip 20 and leg 18 within the space 46A. A second holding force is also applied by the curved surface of the outer flange 42A. This second holding force is applied by the outer flange 42A to a side of the wind deflector 10 opposite that of the first holding force and inner flange 44A. Essentially, the first lip 20 and the leg 18 may rest within the curve of the outer flange 42A. Both holding forces press against opposing sides of the wind deflector 10 to keep the first lip 20 and leg 18 held within the space 46A. FIG. 10 shows a side view of the wind deflector 10 with an arrow pointing in the rotational direction that inserts the first lip 20 and leg 18 into the spaces 46A, 46B.

When the wind deflector 10 and solar panel module M are mounted to the end clamp 32, the wind deflector 10 is located a distance away from the solar panel module M. Although not shown, the peak 15 of the wind deflector can reach an equal or greater height as the mounted solar panel module M. This arrangement allows for air to flow over the top of the solar panel module M in a manner that decreases the low pressure zone created over the top surface of the module M. This decreases the force of the air flow acting on the underside of the module M.

Figure 13:
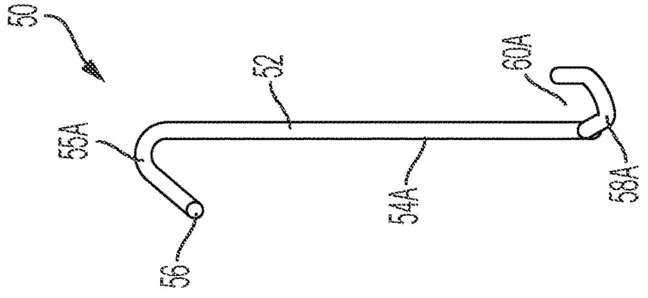
FIG. 13 is a side view of the clip shown in FIG. 12.

With reference to FIGS. 11-17, a clip 50 used to mount the bottom portion of the wind deflector 10 to a rail R of the solar panel system 30 is shown. The clip may be made of a material that is particularly resilient or elastic so that it has the strength and flexibility to stretch about and hold the wind deflector 10 against the rail R in the manner described below. The clip includes a body 52 having two opposing legs 54A, 54B, and a bar 56 extending between the legs 54A, 54B. Each of the legs 54A, 54B has a hook 58A, 58B at their respective ends opposite the ends at which the bar 56 is located. The hooks 58A, 58B both define holes 60A, 60B that may be used to engage with portions of the rail R as discussed below. As can be seen in FIG. 13, both of the legs 54A, 54B include angled portions 55A, 55B, which are rounded and angled downward relative to the top of the legs 54A, 54B. The angled portions 55A, 55B arrange the bar 56 slightly lower than the peaks of the arms 54A, 54B and define an angle that corresponds to the angle formed between the second lip 22 and the flat portion 16 of the wind deflector 10. This arrangement means the second lip 22 will fit within the space defined by the arms 54A, 54B, the angled portions 55A, 55B, and the bar 56 will fit within the space 23 defined between the second lip 22 and the flat portion 16 when the clip 50 is used to mount the wind deflector 10 to the rail R. The lengths of the angled portions 55A, 55B may also correspond to the length of the second lip 22 to further facilitate the connection between the clip 50 and the wind deflector 10.

Figure 16A:
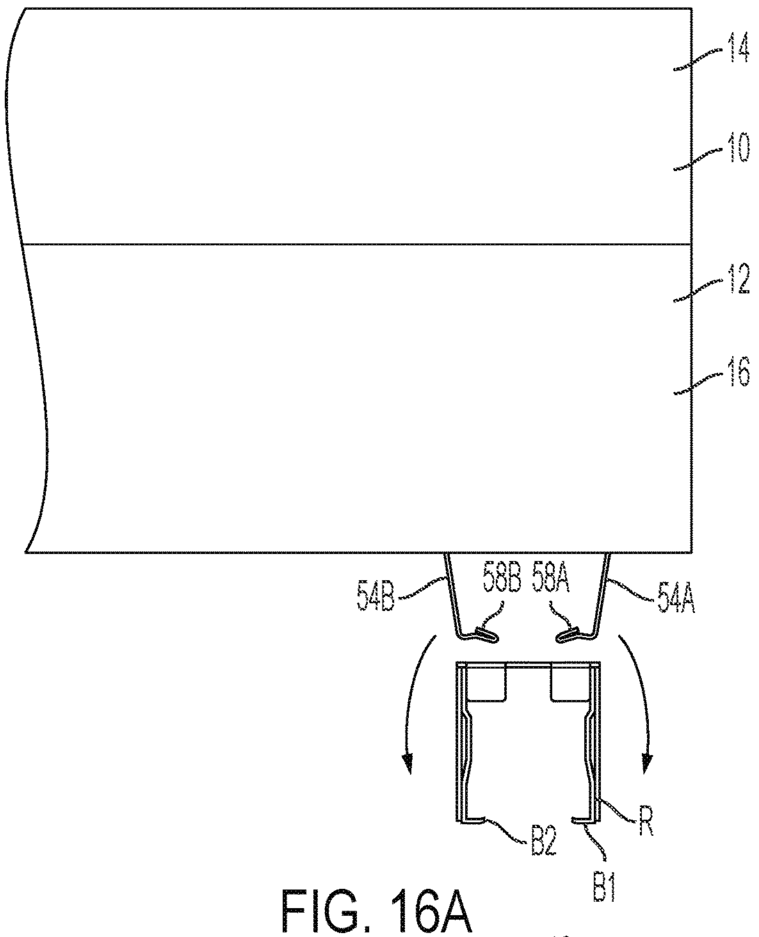
FIG. 16A is a back view of the solar panel system shown in FIG. 3, showing the mounting of the wind deflector and the clip to the rail.
Figure 16B:
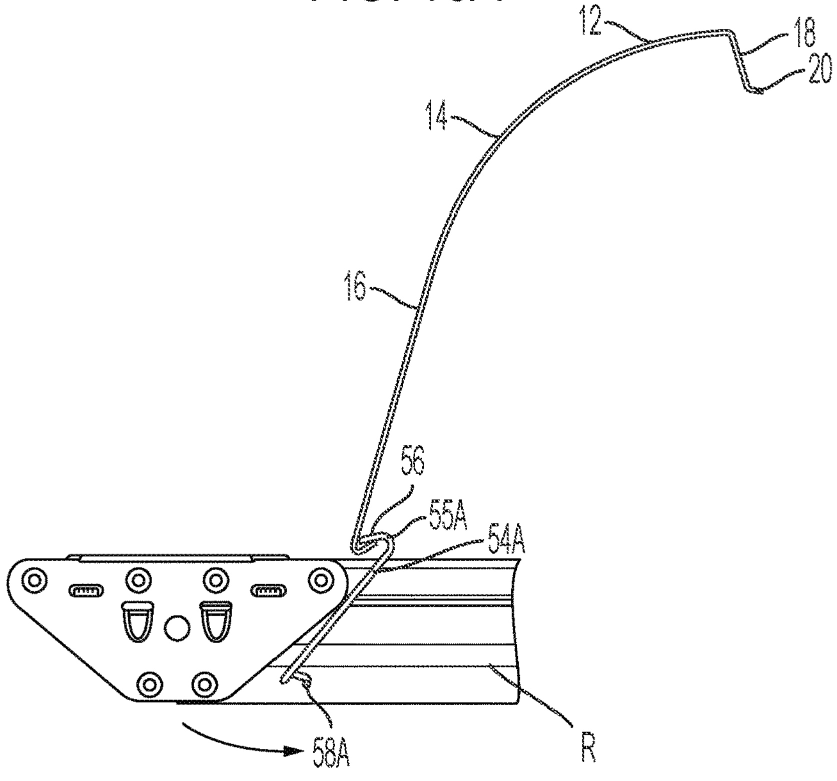
FIG. 16B is a side view of the solar panel system shown in FIG. 3, showing the mounting of the wind deflector and the clip to the rail.
Figure 16C:
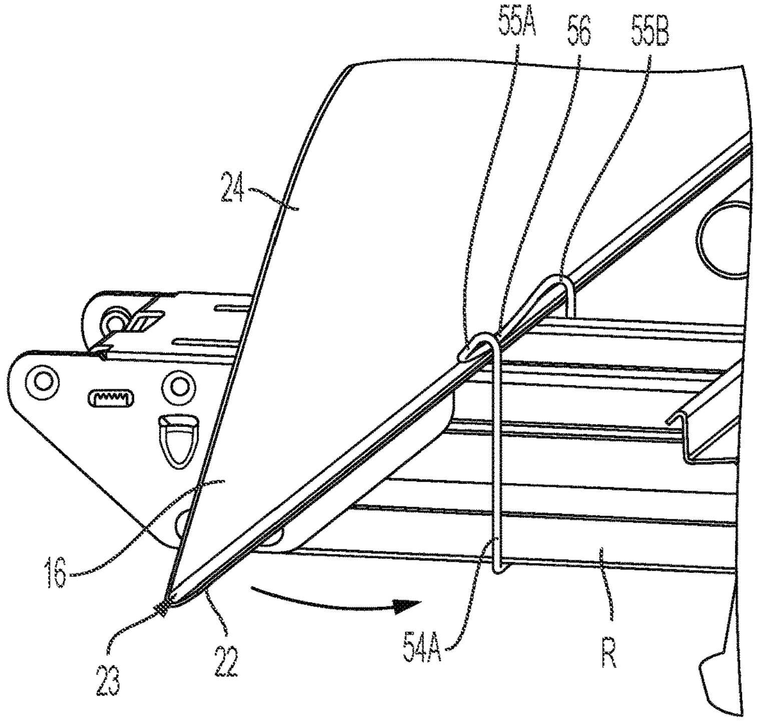
FIG. 16C is a perspective view of the solar panel system shown in FIG. 3, showing the mounting of the wind deflector and the clip to the rail.
Figure 17:
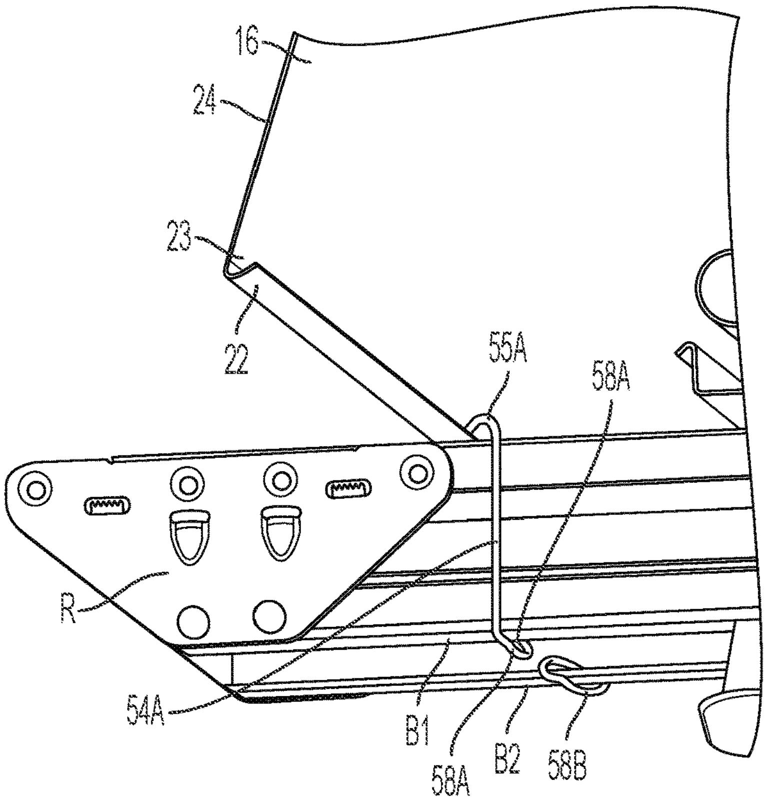
FIG. 17 is a bottom perspective view of the solar panel system shown in FIG. 3, the wind deflector mounted to a rail.

The legs 54A, 54B and hooks 58A, 58B are used to engage the rail R. In particular, the legs 54A, 54B are arranged to contact the sides of the rail R, as shown in FIGS. 11, 16A-17, and the hooks 58A, 58B are used to engage with bottom portions B1, B2 of the rail R, as shown in FIGS. 16A-17. The hooks 58A, 58B may simply wrap around the bottom ends of the rail R, or, as shown in FIG. 17, the hooks 58A, 58B can be shaped so that the holes 60A, 60B receive a respective bottom portion B1, B2 of the rail R therein. The hooks 58A, 58B may be shaped or bent, as shown in the drawings, or they may take other shapes to facilitate their connection to the rail R.

The connection between the wind deflector 10, clip 50, and rail R will now be discussed. As the first lip 20 and leg 18 are inserted into the spaces 46A, 46B, the rotation of the wind deflector 10 brings the second lip 22 toward the rail R. When the second lip 22 is proximate the rail R, as shown in FIG. 10, the bar 56 of the clip 50 is placed within the channel 23. As shown in FIG. 16A, the legs 54A, 54B are pulled outward in the direction of the arrows to fit around the rail R. The clip 50 is then pulled in the direction of the rail R until the hooks 58A, 58B are proximate the bottom portions B1, B2, as shown in FIG. 16B. The legs 54A, 54B are then moved in the direction of the arrow shown in FIG. 16B. With this movement, the hooks 58A 58B and legs 54A, 54B are pulled, so that the hooks 58A, 58B are at approximately the same level as the bottom portions B1, B2, and the legs 54A, 54B extend substantially vertically along the sides of the rail R. This arrangement can be seen in FIGS. 16C and 17. From here, the legs 54A, 54B can be released, and due to their resilient nature, the legs 54A, 54B snap into place against the side of the rail R. If desired, the hooks 58A, 58B are then arranged under the rail R so that the bottom portions B1, B2 are fit within the holes 60A, 60B.

It is further contemplated that instead of hooks 58A, 58B as shown, the ends of the legs 54A, 54B can include a simple extension, extending perpendicular to the legs 54A, 54B. The extensions may define a hook with its respective leg 54A, 54B to secure the clip 50 to the bottom of the rail R. The extensions may also be received in corresponding holes in the opposing sides of the rail R to secure the clip 50 thereto. Operation of a clip 50 with extensions is comparable to the operation described above.

The invention claimed is:

1. A solar panel system comprising a wind deflector, the wind deflector comprising:
- a body comprising a rounded portion and a flat portion extending from the rounded portion;
- a leg extending from the rounded portion;
- a first lip extending from the leg; and
- a second lip extending from the flat portion, wherein the first lip and the second lip are configured to engage with corresponding mounting components of a mounting system for a solar panel module, so that the wind deflector is aligned along a length of the solar panel module,
- wherein the length of the wind deflector is less than the length of the solar panel;
- wherein the alignment of the wind deflector with the solar panel module is such that portions of the solar panel module extend beyond opposing edges of the wind deflector;
- wherein the second lip engages with a second corresponding mounting component;
- wherein the second corresponding mounting component comprises a clip configured to connect to a rail of the solar panel module;
- wherein the second lip and the flat portion define a channel therebetween; and
- wherein the clip comprises a bar configured to fit within the channel and two opposing legs configured to fit about the rail.

2. The solar panel system of claim 1, wherein the portions of the solar panel module extend beyond the opposing edges of the wind deflector by at least 3.5 inches.

3. The solar panel system of claim 1, wherein the first lip engages with a first corresponding mounting component a distance away from the solar panel module.

4. The solar panel system of claim 3, wherein the first corresponding mounting component comprises a base clamp, the base clamp comprising:
- a body; and
- at least one flange configured to engage the first lip.

5. The solar panel system wind deflector of claim 4, wherein the at least one flange comprises a plurality of flanges defining a gap therebetween, the gap being configured to receive the first lip therein.

6. The solar panel system of claim 3 wherein the two opposing legs are configured to engage opposing sides of the rail of the solar panel module.

7. The solar panel system of claim 6, wherein the two opposing arms each comprise a hook further configured to fit opposing corners of the rail.

8. A solar panel system comprising:
- a solar panel module comprising a frame and photovoltaic panel mounted thereto, the solar panel module having a first length;
- a mounting arrangement comprising a post and a rail, the post being configured to support the solar panel module thereon;
- a wind deflector comprising a first end, a second end, a body extending therebetween, and a second length extending parallel to the first and second ends; and
- a clip configured to fit about the rail;
- wherein the first end is configured to be mounted to the post, and the second end is configured to be mounted to the rail;
- wherein the second length is shorter than the first length;
- wherein the wind deflector further comprises a first edge and a second edge, the second length extending between the first edge and the second edge;
- wherein, when the first end is mounted to the post and the second end is mounted to the rail, at least a portion of the solar panel module extends beyond both of the first edge and the second edge;
- wherein the body of the wind deflector further comprises:
  - a first lip at the first end;
  - a leg extending from the lip;
  - a rounded portion extending from the leg;
  - a flat portion extending from the rounded portion; and
  - a second lip extending from the flat portion;
- wherein the first lip is configured to be mounted to the post and the second lip is configured to be mounted to the rail;
- wherein the clip is configured to engage with the second lip;
- wherein the second lip and the flat portion define a channel;
- wherein the clip comprises a bar configured to fit at least partially within the channel in order to mount the second lip to the rail;
- wherein the clip further comprises two arms extending from opposing ends of the bar, the two arms configured to engage opposing sides of the rail; and
- wherein the clip further comprises two hooks, each extending from one of the two arms, the two hooks configured to engage with a side of the rail opposite the side against which the wind deflector is mounted.

9. The solar panel system of claim 8, wherein the portions of the solar panel module extending beyond the first and second edges extend beyond the first and second edges by at least 3.5 inches.

10. The solar panel system of claim 8, wherein the post comprises a base clamp having a first end and a second end, the base clamp comprising:

a groove proximate the first end configured to receive the frame therein; and at least one flange configured to engage the first lip.

11. The solar panel system of claim 10, wherein the at least one flange comprises a plurality of flanges defining a space therebetween, the space configured to receive the first lip therein.

* * * * *